United States Patent [19]

Dennesen et al.

[11] 4,295,277

[45] Oct. 20, 1981

[54] STYLUS POSITIONER

[75] Inventors: Francis G. Dennesen, Beverly; Richard S. Wilson, Swampscott; Roy D. Toulan, Jr., Beverly; Peter Madnick, Andover, all of Mass.

[73] Assignee: Dennesen Electronics Inc., Beverly, Mass.

[21] Appl. No.: 79,041

[22] Filed: Sep. 26, 1979

[51] Int. Cl.³ .............................................. G11B 3/10
[52] U.S. Cl. .................................. 33/181 R; 369/55; 369/244; 369/292
[58] Field of Search ........................... 274/1 R, 23 R; 33/181 R, 174 G, 180 R; 369/55, 244, 292

[56] References Cited

U.S. PATENT DOCUMENTS

| | | | |
|---|---|---|---|
| 2,815,583 | 12/1957 | Stoodley | 33/180 R |
| 3,283,411 | 11/1966 | Steward | 33/180 R |
| 3,493,234 | 2/1970 | Voss et al. | 369/55 |
| 3,865,384 | 2/1975 | Yoshida | 274/23 R |

Primary Examiner—Steven L. Stephan
Attorney, Agent, or Firm—Thomas C. Stover, Jr.

[57] ABSTRACT

The invention provides a method and apparatus for rapid and accurate stylus overhang positioning and tangential alignment with respect to a turntable. Accordingly a stylus locater plate having an aperture and a stylus positioning mark spaced therefrom is mounted on the spindle of a turntable. A pivot arm is connected to the locater plate on the other side of said spindle from the stylus positioning mark. The pivot arm and thus the locater plate, are then rotated around the spindle until such arm crosses over the pivot axis of the stylus arm of the turntable, to locate the mark in the turntable. The stylus arm is then pivoted toward the mark and the stylus cartridge is adjusted in the stylus arm to position the stylus in registration with such mark.

The locater plate is further provided with lines near such mark to guide the angular positioning of the stylus cartridge into a tangential alignment with the record grooves at such mark.

29 Claims, 20 Drawing Figures fig.1 fig.2 fig.3 fig. 14 fig. 15 fig. 20

STYLUS POSITIONER

FIELD OF THE INVENTION

This invention relates to a stylus positioner of a stylus arm on a turntable, particularly a mechanical stylus positioning means for such stylus arm.

BACKGROUND OF THE INVENTION AND PRIOR ART

Although a purchaser of turntable playback recording equipment can spend considerable sums of money to obtain high quality playback of records, which expenses include the turntable, the stylus, the amplifier and the speakers and although a whole audio industry has developed to provide highly engineered electronic components therefor including those listed above, all such high fidelity equipment can be to a large extent nullified if the mechanical sound pick-up is improperly or inaccurately done. For example, the axis of the cutting stylus shaft assembly is generally aligned tangent to the groove being cut in the record master. Accordingly, unless the stylus cartridge is properly positioned so as to be tangentially disposed to the record groove or grooves on the record on the turntable and unless there is a proper stylus overhang which duplicates as closely as possible, the position of the stylus that cut the record master, then tracking error and sound distortion in playback of such record can result.

The mathematics and geometry underlying this tangential relationship was first explored by H. G. Baerwald in his article appearing in the December, 1941 issue of the "Journal of the Society of Motion Picture Engineers". The article discussed the mathematical requirements for the tangential relationship and commented on the audible effects of tangential misalignment of the playback stylus. Though cartridge alignment has been largely ignored for many years, the development of audio playback systems of high resolution capabilities has given new emphasis to the importance of cartridge alignment.

The above Baerwald Article stated that for a pivot type tone arm on a 12" diameter record, the overhang of the stylus should be such that would cause the stylus to cross over two points on such record so as to provide the least average tracking error of the stylus in the record grooves. The Baerwald Article located these points, called "null points" on circles of radii respectively of 2.600 and 4.760 inches from the spindle or axis of the turntable. The difficulty has been to establish where on these circles or one of them, should the associated stylus arm be adjusted, in length, so as to have an accurate overhang for such pivotable stylus arm and turntable. That is, the difficulty has been to locate the correct null point or points for a turntable-stylus arm assembly, which correctly located null point(s) is herein designated as a "geopoint" or "geopoints". To locate such geopoints, extensive calculations and expensive electronic equipment have been employed in a multi-step, lengthy process and still there has been difficulty in obtaining accurate location of such geopoints.

Further the tangential alignment of the stylus cartridge has provided additional, if secondary, difficulty. And there has heretofore been no rapid and accurate alternative to the above prior art and there is a need and market for a method and apparatus for determining stylus location and alignment, which overcomes the above shortcomings.

There has now been discovered an apparatus which translates the rather complex mathematics and geometry of proper stylus positioning and alignment into a relatively quick and easy method for the layman and consumer as well as the audio industry. By the apparatus and method of the present invention, rapid and accurate stylus positioning and alignment with respect to a turntable is readily accomplished.

SUMMARY

Broadly, the present invention provides a stylus positioner relative to a turntable comprising;

a locater plate havng an aperture which fits over the spindle of said turntable and pivots thereon; said plate having a stylus positioning indicator therein at a distance from said spindle; a pivot arm fixedly connectable to said locater plate; means for rotating said pivot arm and thus said locater plate around said spindle toward the pivot axis of the stylus arm of of said turntable to locate said indicator on said turntable so that the stylus can be positioned on said stylus arm in registration with said indicator.

Further provided is a means for adjusting the offset angle of the stylus cartridge relative to the grooves of the record to be played on such turntable.

There is further provided an additional apparatus for positioning and aligning the stylus cartridge which comprises a locater plate having an aperture which fits over the spindle of said turntable and pivots thereon; said plate having a stylus positioning indicator therein at a distance from said spindle; an adjustable length measuring arm for obtaining a measurement of the distance from the turntable spindle to the pivot axis of the associated stylus arm; said plate further having a marker means to locate on said locater plate, according to said measurement, the correct overhang position for the stylus of said stylus arm so that said stylus can be adjusted on said stylus arm in registration with said overhang position.

There is further provided a method for positioning a stylus on a turntable comprising, mounting a locater plate having an aperture on a spindle of a turntable, said plate having a geopoint marker thereon, positioning said plate so that a first line extending from said geopoint through said spindle (axis) intersects at a desired angle with a second line extending from the pivot axis of the stylus arm associated with said turntable at least into proximity with said spindle to correctly position and locate said geopoint relative to said stylus arm pivot axis and turntable and positioning said stylus in registration with the so-located geopoint.

There is further provided an apparatus for adjusting the verticle tracking angle of a stylus arm comprising; an upright member having a scale thereon; a cross arm slideable on said member and said scale which serves to support the stylus arm of a turntable; a level bubble member mountable on said stylus arm such that with the vertical pivot axis of the stylus located at the desired height relative to said turntable and with the bubble level mounted on said stylus arm, said stylus arm is leveled and said upright member is moved, on a reference surface so that the cross arm can be adjusted into contact with said stylus arm so that said scale can be read according to the height of said cross arm thereon and vertical tracking angle number recorded for that record.

Accordingly, the present invention provides method and apparatus for providing stylus positioning on a turntable, as well as lateral alignment and vertical alignment of said stylus.

BRIEF DESCRIPTION OF THE DRAWINGS

The invention will become more apparent from the following detailed specification and drawings in which.

DETAILED DESCRIPTION OF THE DRAWINGS INCLUDING THE PREFERRED EMBODIMENT

Figure 1:
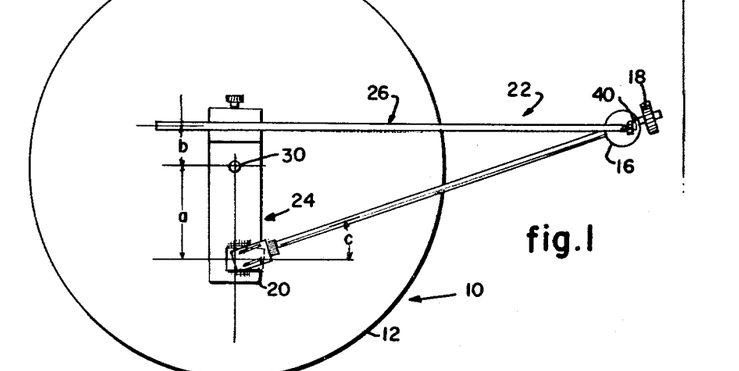
FIG. 1 is a plan view of a turntable and a stylus positioner embodying the present invention in use thereon.
Figure 2:
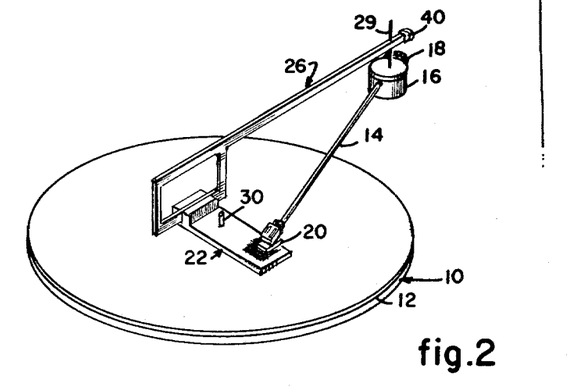
FIG. 2 is an isometric view of the turntable and stylus positioner shown in FIG. 1.

Referring now to the drawings, turntable assembly 10 has turntable 12 and stylus arm 14, which pivots on axis 16 over such turntable as shown in FIGS. 1 and 2. The stylus arm 14 has counterweight 18 at the pivot end thereof and stylus cartridge 20 at the sound pickup end thereof also as shown in FIGS. 1 and 2.

Figure 3:
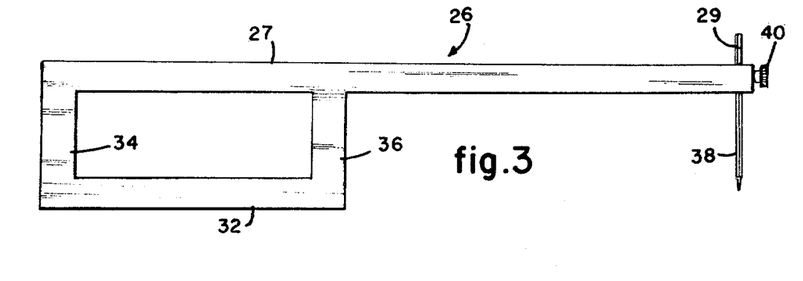
FIG. 3 is an elevation view of a component of the stylus positioner embodying the invention.

Mountable on the turntable assembly 10 is stylus positioner 22, also as shown in FIGS. 1 and 2. The stylus positioner 22 has as components, a stylus overhang locater plate 24, shown in FIGS. 4 and 5 and a pivot arm or trammel as shown in FIG. 3.

The locater plate 24 has an aperture 28 therein which fits over the spindle 30, located at the axis of the turntable 12, as shown in FIGS. 1 and 2.

The locater plate 24 accordingly pivots around the turntable spindle 30, as indicated in FIGS. 1 and 2. The stylus positioner trammel 26, as shown in FIGS. 1, 2 and 3, has a groove engaging slide bar 32 connected by arms 34 and 36 to the extension arm 27. The extension arm 27 has an aperture 29 therein through which passes a drop pin 38, the vertical position of which can be fixed by a turn of the set screw 40, as shown in FIG. 3.

Figure 4:
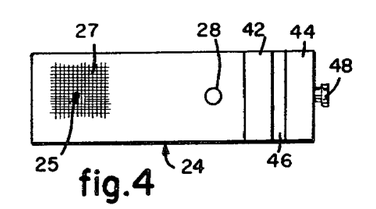
FIGS. 4 and 5 are plan and elevation views respectively, of another component of the stylus positioner embodying the present invention.

The locater plate 24 has rails 42 and 44 which are spaced to define groove 46 therebetween which groove is sized to receive the slide bar 32 of the trammel 26, as shown in FIGS. 4 and 5 and FIGS. 1 and 2. A set screw 48 extends through rail 44 and is turnable to clamp on the sliderail 32 of the trammel 26 to hold same in position in the groove 46 of the plate 24, as indicated in FIGS. 3 and 4 and as shown in FIGS. 1 and 2.

The locater plate 24 further has stylus positioning indicator or point 25 and stylus alignment grid lines 27, as shown in FIG. 4.

Figure 6:
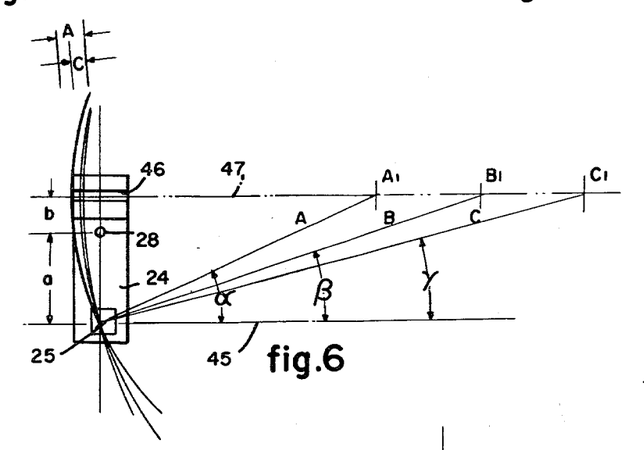
FIG. 6 is a partial view and schematic of a component of the stylus positioner embodying the present invention.

In theory, the locater plate 24 is positioned on the turntable so that the spindle 30 thereof, projects through the locater plate aperture 28 as shown in FIG. 6. The locater plate 24 has mounted thereon stylus positioning point 25 which is located a predetermined distance "a" from the spindle and such plate has mounted therein trammel slide 46, located a predetermined distance "b" from the stylus positioning point 25, also as shown in FIG. 6. As stated in the Baerwald article, above, the distance "a" for a 12" record is 2.600" and the distance "b" is 1.080".

If three stylus arms A, B and C are mounted and pivot respectively at $A_1$, $B_1$ and $C_1$ as shown in FIG. 6, the stylus locater plate 24 is rotated around the spindle 28 until an axis line 47 drawn through the trammel slide 46 aligns with $A_1$, $B_1$ or $C_1$, eg. as shown in FIG. 6. It is the function of the trammel 26, shown in FIGS. 1, 2 and 3, to swing over the pivot axis of the stylus arm and so-position the locater plate and thus the stylus positioning point thereon.

Figure 10:
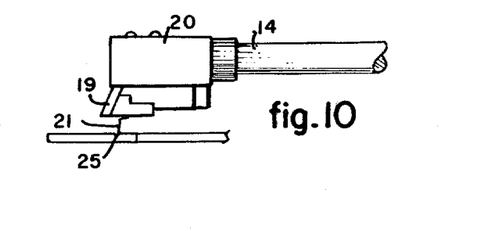

The respective stylus arm A, B or C is then pivoted to bring the stylus 21 directly over the stylus positioning point or geopoint 25, of the locater plate 24, as shown in FIGS. 6 and 10. The stylus is then positioned at its most accurate distance (or overhang) for best or most accurate tracking of the information in the record grooves. However there still remains a need to compensate for the offset angle of the respective tone arms A, B and C, which are shown as angles $\alpha$, $\beta$ and $\gamma$ in FIG. 6.

Figure 11:
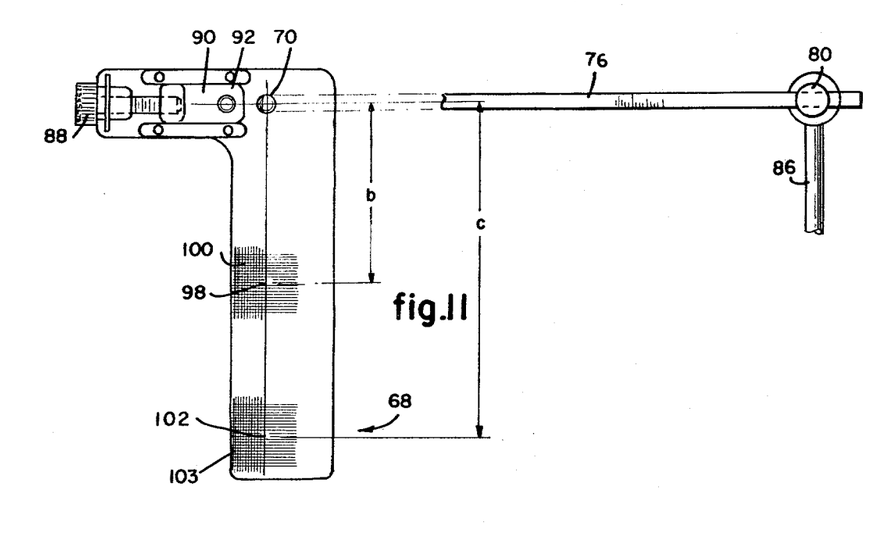
FIG. 11 is a plan view of a component of another stylus positioner embodying the present invention.

The above offset angles show the angle between the respective stylus arms and a line 45 drawn parallel to the axis line 47 (drawn through the trammel slide 46) which angles are the angles that the stylus cartridge, eg. cartridge 20, shown in FIGS. 1 and 2, must be offset relative to the stylus arm, eg. arm 14, shown in FIGS. 1 and 2, to render the stylus cartridge tangent to the record groove at the geopoint 25 (e.g. FIGS. 4 or 6) and/or at a second geopoint located at a distance "c" from the record spindle, to be discussed hereafter, eg. with respect to FIG. 11.

By positioning the cartridge 20 into the above described tangent position with the record groove at the respective geopoint or geopoints, the stylus 21 is properly oriented in the record grooves so as to duplicate the orientation of the cutting stylus in cutting the original (master) record groove. Proper stylus orientation is shown as stylus cross-sections 50 and 48 in FIG. 7. Further, in the enlarged fragmentary view of record grooves 54, 56 and 58 of record fragment 60, shown in FIG. 8, there is shown proper stylus orientation, ie. stylus cross-section 52 in groove 56, which orientation results in accurate tracking of the recorded information. Also shown in FIG. 8 is inaccurate orientations of stylus 53 and 55 in the respective grooves 54 and 58, which results in inaccurate tracking and distortion of the recorded information.

Figures 7, 8:
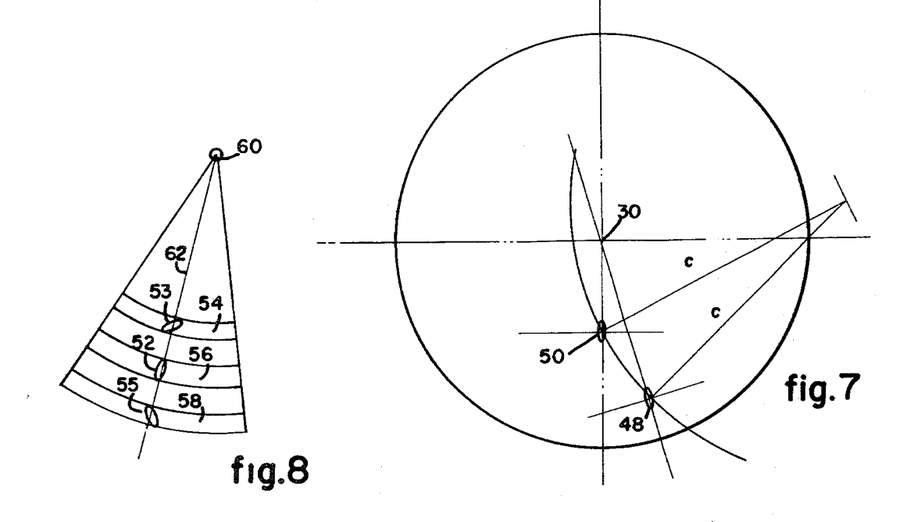
FIG. 7 is a schematic drawing which relates to the stylus positioner of the invention shown in FIG. 1.
FIG. 8 is a schematic drawing which relates to stylus alignment.

The stylus is so mounted in the stylus cartridge that when such cartridge is pivoted according to the proper offset angle as discussed with respect to angles $\alpha$, $\beta$, and $\gamma$ of FIG. 6 and as shown with respect to the position of the cartridge stylus 20 in FIG. 1, the correct stylus alignment, shown in FIG. 7 will be attained. The stylus cartridge is aligned with respect to the grid lines on the locater plate according to the present invention without having to measure offset angles as hereinafter discussed with particular reference to FIGS. 4 and 9.

Figure 5:
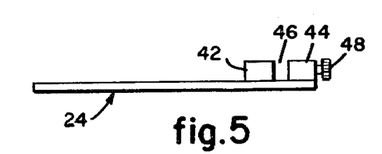

Accordingly, the stylus positioner embodying the invention is employed in cartridge positioning and alignment (laterally) as follows. The locater plate 24 is mounted on the turntable 12 with the spindle 30 extending through the aperture 28 of said plate, as shown in FIGS. 1 and 2. The trammel 26 is placed into the trammel slide groove 46 of the locater plate 24 and the set screw 48 thereof is tightened slightly to secure the trammel 26 in the slide groove 46, as indicated in FIGS. 4 and 5 and as shown in FIGS. 1 and 2. The trammel 26 and thus the locater plate 24 is then rotated around the turntable spindle 30 until the trammel arm 27 extends over the pivot axis 16 of the stylus arm 14 as shown in FIGS. 1 and 2. The locater plate set screw 48 is loosened and the trammel 26 is slid in the groove 46 of the locater plate until the trammel pointer pin 38 is positioned directly over the pivot point or axis 16 of the stylus arm 14, as shown in FIGS. 1 and 2 whereupon the locater plate set screw 48 is then tightened to secure the trammel in place.

The trammel pointer pin 38 is then slid in the bore 29 of the trammel arm 27 until such pin touches or nearly touches the top of the stylus arm pivot assembly at the pivot axis 16 thereof and the set screw 40 is turned to fix the trammel pointer pin 38 in place, as shown in FIG. 3.

With the trammel pointer pin 38 positioned over the stylus arm pivot point 16, the locater plate 24 of the invention has been automatically rotated so that the geopoint 25 is in the accurate position relative to that turntable and stylus arm.

The stylus tone arm 14 is then pivoted so that the stylus 21 is moved over the locater plate 24 to determine where the stylus comes in relation to the geopoint 25. The stylus arm is then raised to provide access to the cartridge fastening members, eg. the cartridge screws 64 and 66, shown in FIG. 9, which screws are loosened to permit movement of the stylus cartridge relative to the stylus arm, to position the stylus 21 in registration with the geopoint 25, as shown in FIG. 10. Completion of this step serves to set the appropriate overhang for the stylus tone arm, eg. arm 14 shown in FIGS. 1, 2 and 10.

Figure 9:
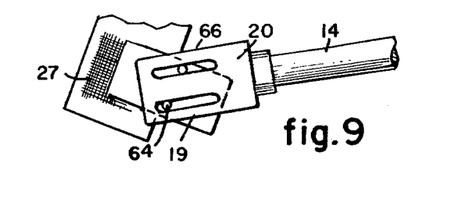
FIGS. 9 and 10 are plan and elevation views respectively, of portions of the stylus positioner embodying the invention.

With the stylus 21 still touching the geopoint 25 and the trammel pointer pin 38 positioned directly over the stylus arm pivot point 16, the proper cartridge offset angle is obtained by pivoting the cartridge 20 to position it parallel to the grid lines 27 of the locater plate 24, as shown in FIG. 9 and indicated in FIGS. 1 and 2. That is, the proper offset angle of the cartridge is obtained when the front and side walls of the cartridge body are parallel or aligned with the respective grid lines 27, which grid lines are shown in FIGS. 4 and 9 as previously indicated. The alignment of the cartridge with the grid lines 27 is advantageously obtained in combination with the positioning of the stylus point 21 directly on or over the geopoint 25, again as shown in FIGS. 9 and 10.

The stylus arm 14 is then raised and the cartridge mounting screws 66 and 64 are then tightened to fix the cartridge in place. The stylus arm is then lowered again to the geopoint 25 to check the location of the stylus point registration and the alignment of the cartridge end and side walls with the grid lines 27 as discussed above.

The above procedure is referred to herein as stylus point positioning and cartridge alignment, collectively known herein as lateral alignment.

Another apparatus embodying the stylus positioner of the present invention also serves to provide lateral alignment for a stylus cartridge on a turntable. In such other embodiment, geopoint locater plate 68 has aperture 70 which fits over the spindle 72 of a turntable 74, as shown in FIGS. 11, 14 and 15.

Figure 12:
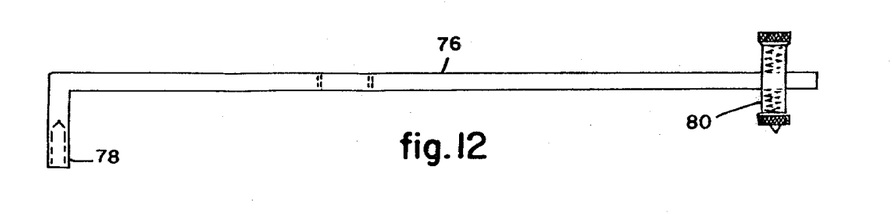
FIG. 12 is an elevation view of another component of said other stylus positioner embodying the present invention.
Figure 13:
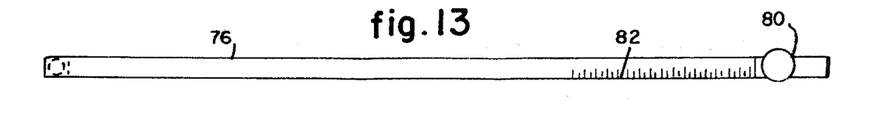
FIG. 13 is a plan view of the component shown in FIG. 12.
Figure 14:
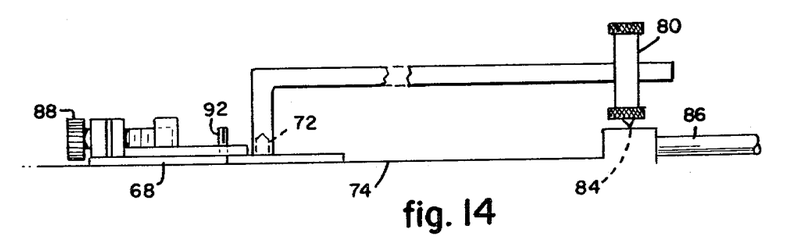
FIG. 14 is an elevation view of the assembed components of said other stylus positioner embodying the present invention.

Measuring arm 76 has socket arm 78 which also fits over the turntable spindle 72 as shown in FIGS. 12 and 14. The other end of such measuring arm 76 has moveable pointer 80, as shown in FIGS. 12 and 14, which pointer 80 moves on a graduated scale 82, shown in FIG. 13 and which is moved into position above the axis 84 of the stylus arm 86, to locate such axis as shown in FIGS. 12, 13 and 14.

The number or unit read on the scale 82, gives a value which is applied in rotating the turnscrew 88 which moves the slide 90 back and forth and determines the location of the stylus locater peg 92, as shown in FIGS. 13, 11 and 14.

Figure 15:
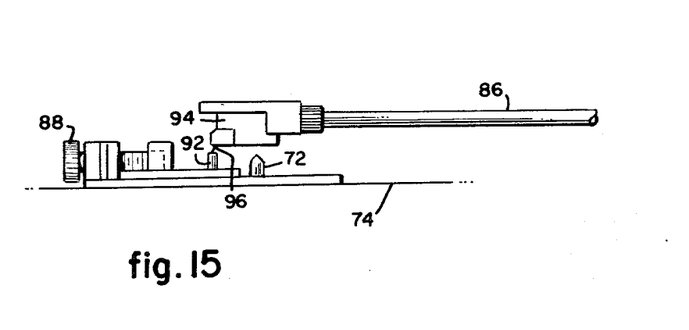
FIG. 15 is an elevation view of the component of said other stylus positioner embodying the invention, which component is shown in plan view in FIG. 11.

The stylus arm 86 is then pivoted over the stylus peg 92 and the cartridge 94 thereon adjusted until the stylus 96 centers on the stylus peg 92 to determine the stylus overhang as shown in FIG. 15.

The stylus arm 86 is then pivoted toward the geopoint 98 and the geopoint indicator plate 68 is pivoted on the turntable spindle 72 until the geopoint 98 shown in FIG. 11 and the stylus 96, shown in FIG. 15, are in registration. The stylus can be lowered to contact the geopoint 98 as discussed above with respect to the previous embodiment of the stylus positioner of the invention.

The stylus cartridge can then be pivoted on the stylus arm so that the side and end walls thereof align with the grid lines 100 on the geopoint plate 68 to obtain the proper stylus cartridge offset angle as previously discussed.

The stylus arm 86 is then pivoted toward the geopoint 100 and the geopoint indicator plate 68 is pivoted on the turntable spindle 72 until the geopoint 102 shown in FIG. 11 and the stylus 96 shown in FIG. 15 are in registration. The stylus can be lowered to contact the geopoint 102 as discussed above.

The stylus cartridge should align with both the grid lines 100 and 103 of the respective geopoints 98 and 102 when the stylus is (sequentially) in registration with such respective geopoints shown in FIG. 11. If the stylus cartridge is out of alignment with the grid lines of either geopoint 98 or 102, this indicates that the stylus overhang is inaccurate and should be reset.

Again this (second) embodiment of the invention (like the above first embodiment) serves to locate the proper stylus overhang, the position the stylus on the stylus arm and also to align the stylus cartridge at the proper offset angle for accurate pick-up and sound reproduction from record grooves according to the invention.

Figure 16:
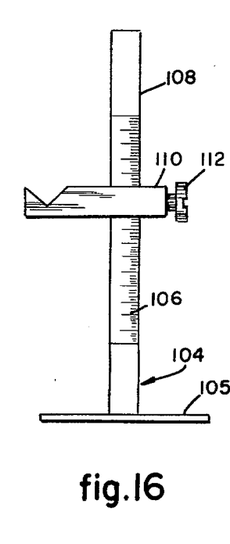
FIG. 16 is an elevation view of first component of a vertical tracking angle guide for a stylus.

Again, the "b" distance from the spindle to the geopoint is 2.600" and the "c" distance to the second geopoint is 4.760", for a 12" record. The distances "b" and "c" of course can have other values as desired within the scope of the present invention particularly where records of different diameters are employed. Similarly, the "a" distance is preferably 1.080" for a 12" diameter record and a straight trammel arm (eg. arm 27 shown in FIG. 3). However, the "a" distance can vary according to record size, trammel arm shape and other variables, within the scope of the present invention.

Where it is desired to adjust the vertical tracking angle (VTA) of a stylus arm, the invention provides the following method and apparatus for such adjustment. A stylus armrest 104, having a graduated scale 106 on an upright support 108 and a crossarm 110 having a bore therethrough, not shown, which permits the support arm to slide up and down on the vertical support 108, which crossarm 110 has a set screw 112 mounted therein, which can be tightened to fix the location of such crossarm is shown in FIG. 16. For stability the stylus arm support has base member 105, also shown in FIG. 16.

Figure 17:
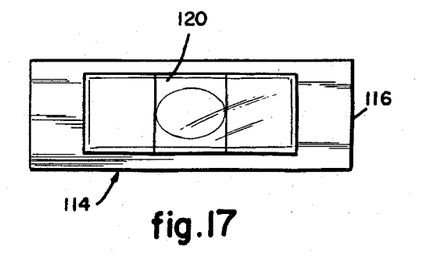
FIGS. 17, 18 and 19 are plan, side elevation and end elevation views respectively of a second component of a vertical tracking angle guide for a stylus.
Figure 18:
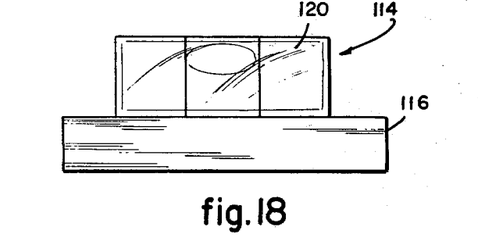
Figure 19:
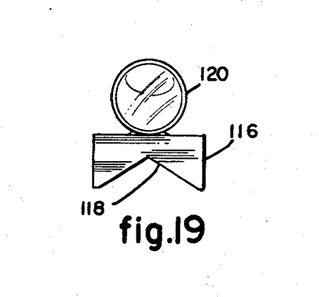

Also provided is a level bubble assembly 114, which has a base member 116 having a longitudinal groove 118 therein and a transparent liquid and bubble container 120 mounted thereon, as shown in FIGS. 17, 18 and 19.

Figure 20:
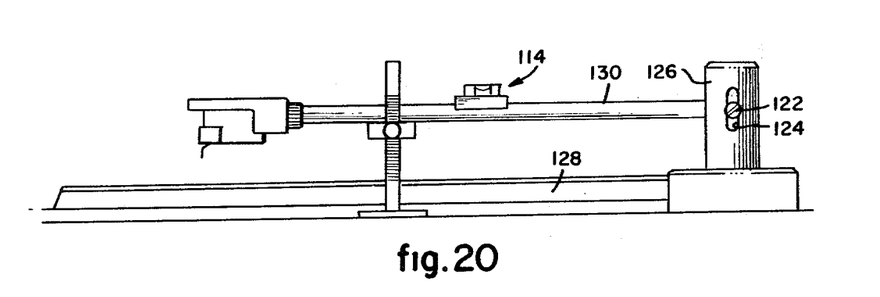
FIG. 20 is an elevation view of the vertical tracking angle guide embodying the invention employed with a stylus.

In operation, the mounting pin 122 of the stylus arm 130 is moved up or down and a record played until the highest clarity of sound reproduction is heard. Then the stylus arm pivot pin 122 is tightened to fix the pivot location of such arm and the stylus arm rest 104 is brought into position (on a reference surface, eg. of the turntable) underneath the arm and the support cross arm 110 moved up to engage same and secured in place by the set screw 112, as shown in FIG. 20. The level member 114 is placed on the stylus arm and the cross arm 110 moved up or down along the support upright 108 until a level reading is obtained on the level 114, in the arrangement shown in FIG. 20. Thereupon a reading is taken from the graduated scale and the number is written on the record label so that in future use the proper VTA for the stylua arm for that record can readily be set. It should be noted that the VTA often differs from record to record owing to a lack of industry standards for the angle of the cutting stylus in record production.

The next time the above record is to be played, the above procedure is reversed. Accordingly, the stylus arm support or VTA reference guide 104 is preset by moving the cross arm 110 on the scale to the previously recorded VTA reference number. The stylus arm is then placed upon such cross arm 110 in the manner indicated in FIG. 20. Then the bubble level 114 is placed on the stylus arm 130. Finally the stylus arm pivot pin 122 is loosened and that end of the stylus arm is moved up or down until a level reading is obtained on the bubble level and then the pivot pin 122 is tightened to fix the pivot point of such stylus arm as indicated in FIG. 20. Desirably the bubble level is placed on the stylus arm in the same location as before when obtaining the original VTA reading. The VTA reference guide 104 and the bubble level 114 can then be removed and the stylus arm has a proper VTA setting for that record.

A similar procedure is employed for each record that it is desired to obtain the VTA reference number and setting.

The above method of obtaining the most accurate vertical tracking angle is herein called the vertical alignment method and apparatus.

The present invention concerns itself with obtaining high quality and accurate stylus pickup of recorded sound through both lateral and vertical alignment as discussed above. As previously stated, expensive audio equipment can be greatly underutilized without proper and accurate stylus pickup.

The locater or geopoint plate and the trammel and its components of the first embodiment of the invention, eg. FIGS. 1 to 10, can be made of any suitable material including wood, plastic, or metal. Preferably such components are made of plastic, eg. ABS, polystyrene and polyethylene or metal, eg. stainless steel, aluminum and titanium.

In the other embodiment of the stylus positioner of the invention, eg. as shown in FIGS. 11 to 15, these components likewise are made of the same materials as those of the first embodiment.

Similarly, the vertical alignment equipment, eg. as shown in FIGS. 16 to 20 can be made of wood, plastic or metal and are preferably being made, of course, of transparent materials, either glass or plastic.

The stylus positioning indicator or geopoint in the locater plate can be marked in various ways, eg. a crosscut, a tapering or other recess, a raised surface or projection, a dot or other marking, and the like. The thickness of such locater plate can vary as desired, but preferably is the same thickness or the general thickness of a record. The trammel can slide in the slide groove as previously discussed with respect to FIGS. 1, 2 and 5 so as to be extendable or retractable in effective length and to position the trammel pointer pin over the pivot axis of the stylus arm as previously discussed. However, the trammel can be extendable in other ways, eg. can have a telescopic arm where desired, within the scope of the present invention.

The geopoint distances "a", "b" and "c" discussed and illustrated for example, in FIGS. 1 and 11, are preferably the values given for a 12" record in view of the above referenced Baerwald Article. However, these distances can vary as desired within the scope of the present invention depending upon record sizes and/or results desired.

The stylus positioner of the present invention, as disclosed herein and as shown, translates the rather complex mathematics and geometry of proper stylus positioning and alignment, into a relatively quick-to-use method and apparatus for the turntable user and the audio industry as well. Such stylus positioner is advantageously utilized each time a cartridge change is made or tracking force adjusted and periodically thereafter to insure optimum performance of the record playback system.

The following is intended as an example of the use of the first embodiment of the present invention and should not be construed in limitation thereof.

EXAMPLE I

A good quality high fidelity stereo turntable with good quality speakers was activated and a 12" new major label record played thereon. The recording sound was generally satisfactory, but distortion and flatness was noted.

The record was removed and the stylus positioner of the first embodiment of the invention was installed on the turntable with the locater plate in place over the turntable spindle and the trammel installed in the slide groove of the locater plate. The trammel was moved in the slide groove until the drop pin thereof centered on the pivot axis of the stylus arm of the turntable assembly. The trammel set screw was tightened as was the drop pin set screw to fix the location of the geopoint on the locater plate.

The stylus arm of the turntable was then pivoted over the geopoint and lowered with respect thereto. The stylus was found to be about ⅛" short of the geopoint.

The stylus arm was then lifted and the screws on the stylus cartridge were loosened and the stylus cartridge was moved forward the ⅛". The stylus arm was again lowered and the stylus was observed to be in registration with the geopoint.

The stylus cartridge was then noted to be out of alignment with the grid lines on the locater plate. With the stylus resting in the conically indented geopoint, the stylus cartridge was pivoted until the slide and end walls thereof aligned parallel with the grid lines in the locater plate.

The stylus arm was lifted and the stylus cartridge screws tightened. The stylus arm was then relowered to the locater plate. The stylus was still in registration with the geopoint and the stylus cartridge was found to still be in alignment with the grid lines on the locater plate.

The stylus arm was then pivoted back to its arm rest and the stylus positioner of the invention was removed from the turntable.

The same record was then lowered onto the turntable and the turntable assembly was activated with the stylus automatically lowering into the outside grooves of the record.

As the stylus moved into the first recorded segment, an improvement was noted immediately in the clarity and tone of the music issuing forth. Tones, chords and nuances not heard or noticed previously were clearly audible and a generally greater fidelity of recording playback was noted.

What is claimed is:

1. A stylus positioner for a turntable assembly, which assembly has a turntable mounted to rotate about a spindle and a stylus arm pivotably mounted proximate said turntable, which stylus arm moves on a pivot axis relative to said turntable, which positioner comprises; a locater plate having an aperture which fits over said spindle and pivots thereon; said plate having a stylus positioning indicator therein at a distance from said spindle; a pivot arm fixably connectable to said locater plate; means for rotating said pivot arm and thus said locater plate around said spindle toward the pivot axis of said stylus arm to locate said indicator on said turntable so that the stylus can be positioned on said stylus arm in registration with said indicator.

2. The stylus positioner of claim 1 wherein said indicator is marked by a change of thickness in said plate.

3. The stylus positioner of claim 2 wherein said change of thickness is a conical shape.

4. The stylus positioner of claim 1 having a cartridge alignment guide relative to the axis of said turntable.

5. The stylus positioner of claim 4 wherein said alignment guide is mounted on said locater plate proximate said stylus positioning indicator.

6. The stylus positioner of claim 5 wherein said alignment guide is a plurality of grid marks.

7. The stylus positioner of claim 5 wherein said alignment guide is a plurality of grid ridges.

8. The stylus positioner of claim 1 wherein said locater plate has a thickness equivalent to a 12" record of between 0.10 inches to 0.20 inches.

9. The stylus positioner of claim 1 wherein said pivot arm is a trammel which is connectable to said locater plate on the other side of said spindle from said stylus positioning indicator.

10. The stylus positioner of claim 9 wherein said trammel and said locater plate are connectable at right angles.

11. The stylus positioner of claim 1 wherein said indicator is a geopoint positioned on said locater plate at a distance of 2.600" from said spindle.

12. The stylus positioner of claim 9 wherein said trammel is connectable to said plate at 1.080" from said spindle and said indicator is a geopoint located 2.600" from said spindle.

13. The stylus positioner of claim 1 wherein said pivot arm is a trammel which is extendable in length relative to said locater plate.

14. The stylus positioner of claim 1 wherein said pivot arm is a trammel which has a pointer extending transversely therewith and is positionable over the pivot axis of the stylus arm.

15. The stylus positioner of claim 1 wherein said pivot arm is a trammel which is positionable in a groove in said locater plate and secured in place by a set screw in said locater plate.

16. A stylus positioner for a turntable assembly, which assembly has a turntable mounted to rotate around a spindle and a stylus arm pivotably mounted proximate said turntable, which stylus arm moves on a pivot axis relative to said turntable, which positioner comprises; a locater plate having an aperture which fits over said spindle and pivots thereon; said plate having a stylus positioning indicator therein at a distance from said spindle; an adjustable length measuring arm for obtaining a measurement of the distance from said spindle to the pivot axis of said stylus arm; said plate further having a marker means to locate on said locater plate according to said measurement the correct overhang position for the stylus of said stylus arm so that said stylus can be adjusted on said stylus arm in registration with said overhang position.

17. The stylus positioner of claim 16 having a cartridge alignment guide mounted on said locater plate proximate said stylus positioning indicator for stylus alignment after said locater plate and stylus arm and rotated to register said stylus over said indicator.

18. The stylus positioner of claim 16 wherein said measuring arm has mounted thereon a scale and a transverse pointer which slides back and forth over said arm and said scale, which pointer is moveable into alignment with the pivot axis of said stylus arm.

19. The stylus positioner of claim 16 wherein the locater plate also has a scale and said marker means includes a peg which is moveable relative to said scale.

20. The stylus positioner of claim 16 wherein the stylus positioning indicator of said locater plate is a geopoint located 2.600" from the axis of said spindle.

21. The stylus positioner of claim 20 wherein said locater plate has a plurality of grid marks proximate said geopoint.

22. The stylus positioner of claim 20 wherein said locater plate has as a second positioning indicator, a geopoint located a distance of 4.760" from the axis of said spindle.

23. A method for positioning a stylus on a turntable comprising mounting a locater plate having an aperture on a spindle of a turntable, said plate having a geopoint mark thereon, positioning said plate so that a first line extending from said geopoint through said spindle intersects at a desired angle with a second line extending from the pivot axis of the stylus arm, associated with said turntable at least into proximity with said spindle to correctly position and locate said geopoint relative to said stylus arm pivot axis and turntable and positioning said stylus in registration with the so-located geopoint.

24. The method of claim 23 wherein said second line extends from said pivot axis to a point located a desired distance on a remote side of said spindle from said geopoint.

25. The method of claim 24 wherein said locater plate is positioned so that said first line is disposed at right angles with said second line.

26. The method of claim 24 wherein said desired distance is 1.080".

27. The method of claim 23 wherein with the stylus positioned in registration with said geopoint, the stylus cartridge is aligned tangent to the record groove at said geopoint.

28. The method of claim 27 wherein said locater plate has grid markers proximate said geopoint and said stylus cartridge is aligned parallel with said markers.

29. The method of claim 23 wherein said second line extends from said pivot axis through the centerpoint of said spindle.

* * * * *